UNITED STATES PATENT OFFICE.

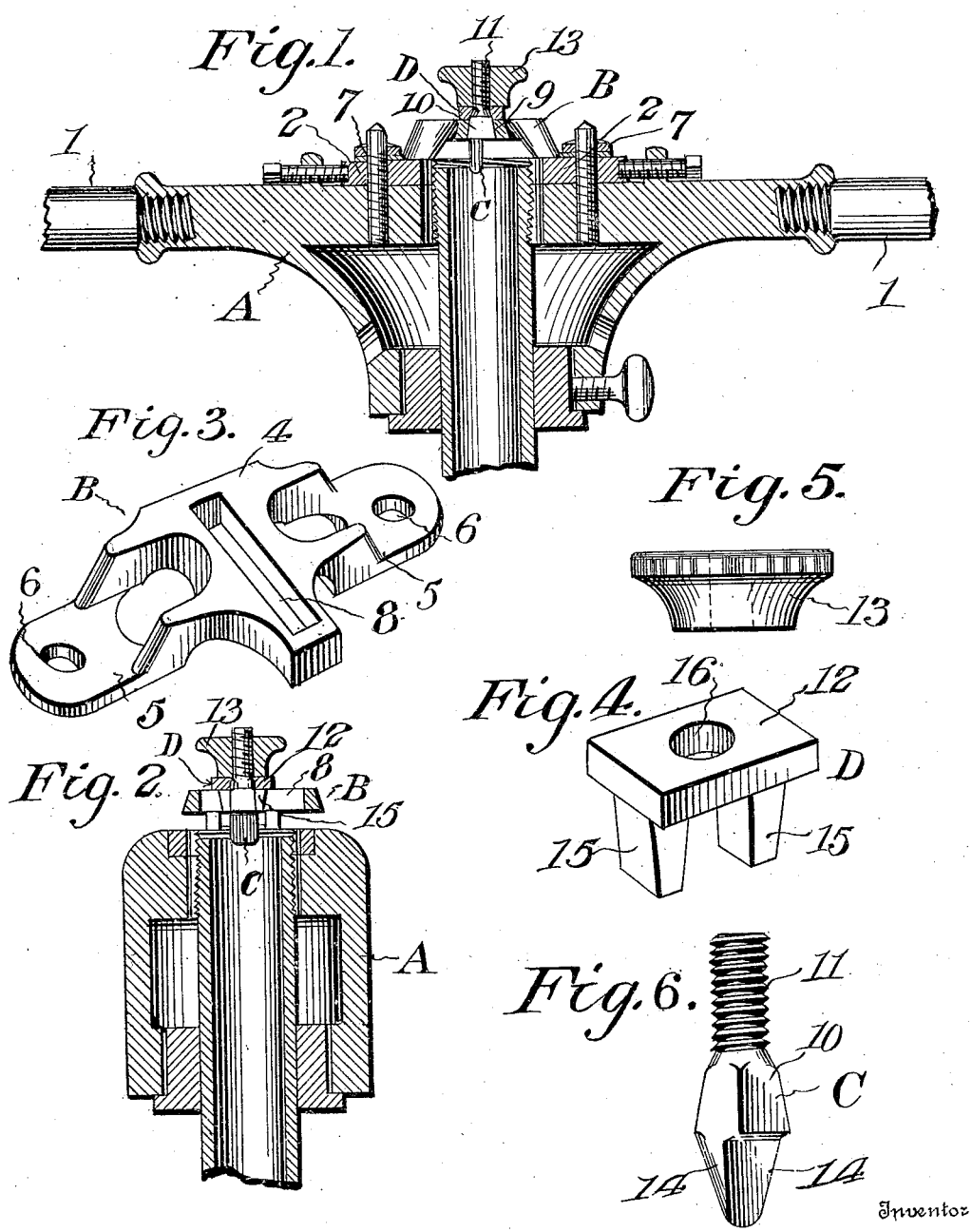

GEORGE REEB, OF PITTSBURG, PENNSYLVANIA.

PIPE-REAMER ATTACHMENT FOR THREADERS.

944,909. Specification of Letters Patent. Patented Dec. 28, 1909.

Application filed January 5, 1909. Serial No. 470,765.

*To all whom it may concern:*

Be it known that I, GEORGE REEB, a citizen of the United States, residing at Pittsburg, in the county of Allegheny and State of Pennsylvania, have invented new and useful Improvements in Pipe-Reamer Attachments for Threaders, of which the following is a specification.

This invention relates to combined pipe threaders and reamers, and relates more particularly to an attachment to be used in connection with pipe die stocks of any approved construction, whereby the pipe can be reamed during the threading operation so as to remove the internal bur formed at the end of the pipe when the same is cut by a pipe cutter.

The invention has for one of its objects to improve and simplify the construction of devices of this character so as to be comparatively simple and inexpensive to manufacture, reliable and efficient in use, and conveniently manipulated.

Another object of the invention is the provision of a reamer attachment including a frame adapted to be secured to the die stock and on which is adjustably mounted a cutter or reaming element.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a central longitudinal section of a die stock with the attachment thereon. Fig. 2 is a detail sectional view taken at right angles to the section of Fig. 1. Fig. 3 is a perspective view of the frame of the attachment. Fig. 4 is a perspective view of the cutter holder. Fig. 5 is a side view of the clamping nut for the cutter. Fig. 6 is a perspective view of the cutter.

Similar reference characters are employed to designate corresponding parts throughout the views.

Referring to the drawing, A designates the body of the die stock which may be of any approved construction and equipped with operating handles 1, and mounted on the die stock are threading dies 2, details of which need not be here described since they form no part of the present invention.

The attachment comprises a frame designated by B which is secured in any suitable manner at a point over the threading elements 2. The body portion 4 of the frame is provided with base members or feet 5 that have apertures 6 for receiving the screws 7 on the die stock, which screws are provided with nuts 7 which clamp the frame B of the die stock. The frame has a transversely-extending slot 8 in which the cutter C is adjustably mounted. The opposed longitudinal walls 9 of the slot diverge downwardly as shown in Fig. 8 for engagement by the wedge portion 10 of the cutter C, there being formed above the said wedge portion a threaded stud 11 which passes upwardly through the plate 12 of the holder D and receives a clamping nut 13 whereby the cutter is clamped in position. The cutter is provided with sharp edges 14 which serve to remove the bur on the inner edge of the pipe. The holder 12 is slidably mounted on the body 4 of the frame B and is provided with depending lugs 15 which engage in the slot 8 of the frame so that the holder can slide back and forth in the latter. These lugs 15 are spaced apart at opposite sides of the opening 16 that receives the threaded stud 11, and by slightly loosening the clamping nut 13, the holder D and cutter C can be adjusted in any direction or other to adapt the cutter to pipes of different sizes. In tightening the clamping nut 13, the cutter is drawn upwardly so that the wedge portion 10 thereof will bind in the dove-tail slot 8 while the plate portion 12 of the holder D will be clamped against the top flat face of the frame B.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. An attachment for die stocks comprising a frame provided with a slot, a slidable holder having lugs engaging in the slot and provided with an aperture, a cutter extending through the slot and said aperture and having a portion engaging the frame, and clamping means for securing the holder and cutter in adjusted position in the slot.

2. An attachment for die stocks comprising a frame provided with oppositely-inclined spaced walls, a holder slidably mounted on the frame and guided by the said walls, a cutter provided with a wedge portion arranged to frictionally engage the said walls and having a stud passed through the holder, and means mounted upon said stud for clamping the cutter and holder in fixed position.

3. An attachment for die stocks comprising a frame having a transversely extending slot formed with undercut walls, a holder slidably mounted upon the frame and comprising a plate having an opening therein, and having lugs at opposite sides of the opening entering the slot of the frame, a cutter having a wedge portion engaging the undercut walls of the slot provided in the frame and formed with a threaded stud passing through the opening in the plate of the holder, and a clamp nut mounted upon the threaded stud of the cutter to secure the latter and the holder to each other and to the frame.

In testimony whereof I affix my signature in presence of two witnesses.

GEORGE REEB.

Witnesses:
   JOHN MacD. MURRAY,
   EDWARD EVERETT.